Figure 1:
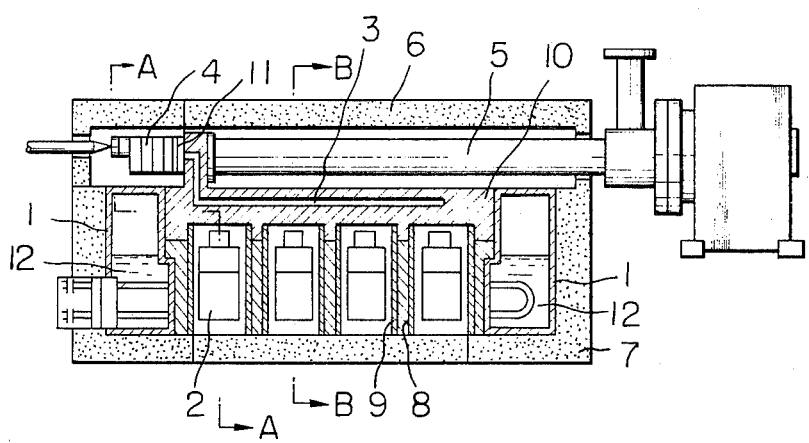

United States Patent [19]

Ogasawara et al.

[11] 4,035,127
[45] July 12, 1977

[54] MELT SPINNING APPARATUS

[75] Inventors: Masafumi Ogasawara, Otsu; Nobu Yamaguchi, Shiga; Yoshio Tsuchiyama, Kyoto, all of Japan

[73] Assignee: Toray Industries, Inc., Tokyo, Japan

[21] Appl. No.: 534,795

[22] Filed: Dec. 20, 1974

[30] Foreign Application Priority Data

Dec. 25, 1973 Japan .............. 48-143708
June 22, 1973 Japan .............. 48-73550

[51] Int. Cl.² ........................................ D01D 3/00
[52] U.S. Cl. .................. 425/192 S; 425/378 S; 425/382.2
[58] Field of Search ............. 425/192, 382.2, 461, 425/378 S, 131.5; 264/171

[56] References Cited

U.S. PATENT DOCUMENTS 2,841,821  7/1958  Phipps ................ 425/192
3,271,817  9/1966  Kanbar ............... 425/378 S X
3,655,314  4/1972  Lenk et al. .......... 425/382.2 X

FOREIGN PATENT DOCUMENTS 10,483  5/1969  Japan ................ 425/382.2

Primary Examiner—Robert D. Baldwin
Attorney, Agent, or Firm—Armstrong, Nikaido & Marmelstein

[57] ABSTRACT

A compact melt spinning apparatus having a screw-type extruder or extruders is provided. A metering pump or pumps, a molten polymer conduit or conduits and a spinning pack or packs and optionally the barrel(s) of the extruder(s) are positioned inside a heating frame encased in a casing of a thermal insulation material. The conduit(s) is arranged on a horizontal plane located above the spinning pack(s), and the extruder(s) and the metering pump(s) are arranged in a horizontal line and located above the conduit(s).

11 Claims, 14 Drawing Figures

MELT SPINNING APPARATUS

This invention relates to an apparatus for melt spinning a fiber forming synthetic polymer, particularly having a compact structure.

Heretofore many apparatuses for melt spinning a fiber forming synthetic polymer have been proposed. One typical type of the melt spinning apparatuses comprises an extruder for melting a synthetic polymer in the form of for example pellets and extruding it therefrom, a spinning pack or packs comprising at least one spinneret, and a metering pump for metering and forcing the molten polymer to the spinning pack or packs. However, the melt spinning apparatus of such a type possesses a structure, for example, such that the extruder is vertically disposed therein or a long conduit is fitted for connecting the extruder with the metering pump. This structure is disadvantageous in that a large amount of heat is required for maintaining the spinning apparatus at desired temperatures.

Recently a spinning apparatus of a compact type wherein a metering pump or pumps, a spinning pack or packs, a conduit or conduits for connecting the metering pump or pumps with the spinning pack or packs are positioned in one casing of a thermal resistant material has been proposed in Japanese Patent Publication 17727/1972. This spinning apparatus is rather compact as compared with most conventional apparatuses. However, it is not completely satisfactory because a long conduit is required for connecting the extruder with the metering pump or pumps positioned in the casing.

A main object of the present invention is to provide a melt spinning apparatus of a compact type, which is advantageous in that it is economical in heat.

Other objects and advantages of the present invention will be apparent from the following illustration.

In accordance with the present invention there is provided an apparatus for melt spinning a fiber forming synthetic polymer comprising at least one screw type extruder for melting and extruding the synthetic polymer, at least one metering pump, at least one spinning pack comprising at least one spinneret, and at least one conduit for permitting the molten polymer passage therethrough from the metering pump to the spinning pack, characterized in that the metering pump, the spinning pack and the conduit are positioned inside a heating frame provided with a heating means therein; said heating frame being encased, together with the portion of the extruder to be heated, in a casing composed of a thermal insulation material; and the conduit extends on a substantially horizontal plane located above the spinning pack, and the extruder and the metering pump form a substantially horizontal line and are located above the conduit.

Figure 2:
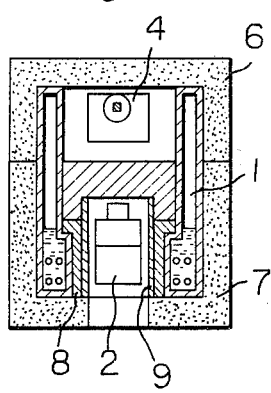
Figure 3:
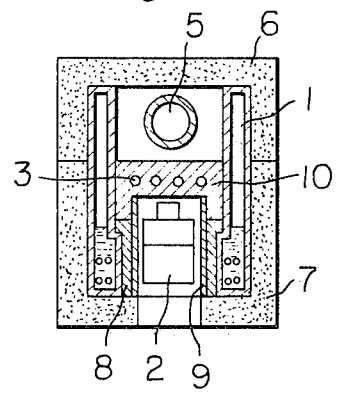
Figure 4:
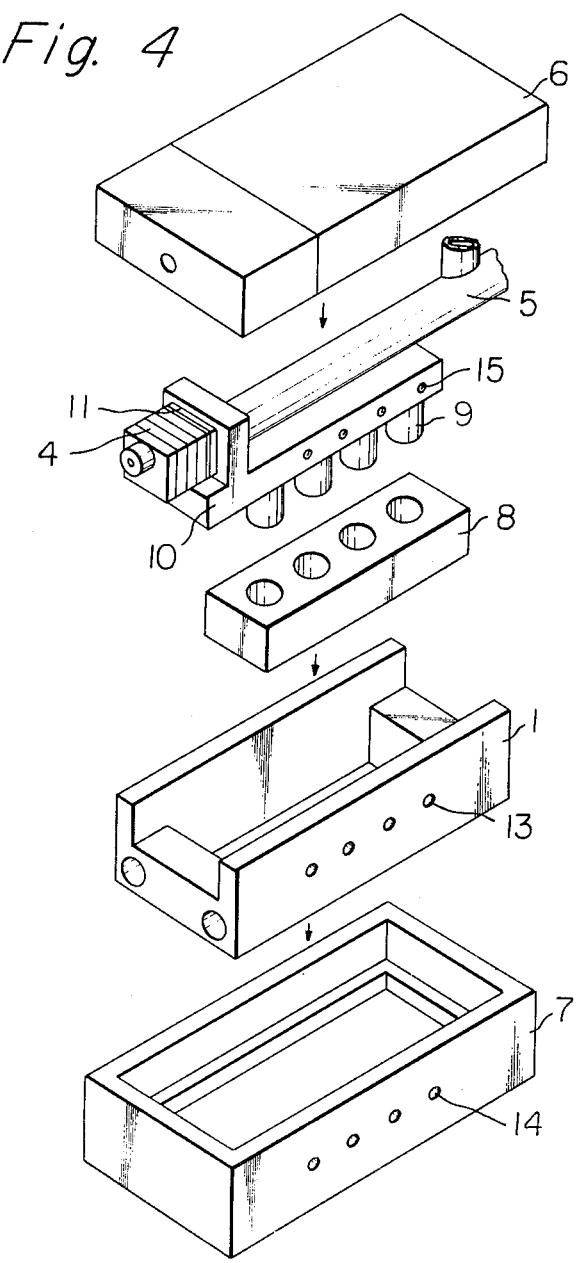
Figure 5:
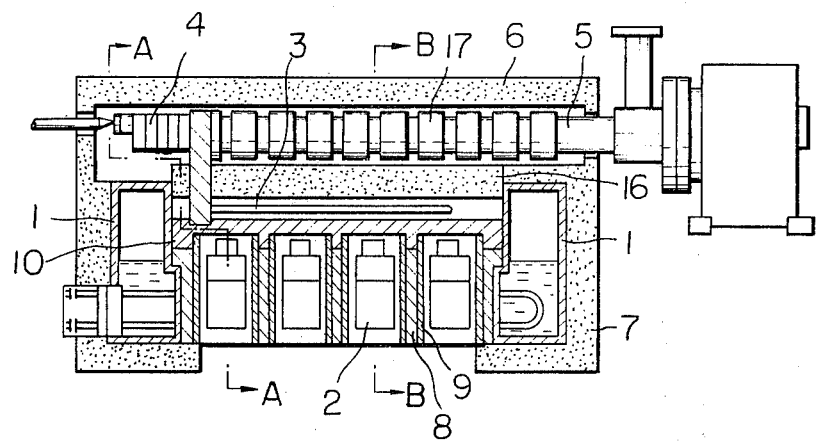
Figure 6:
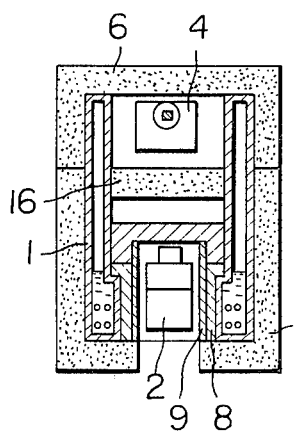
Figure 7:
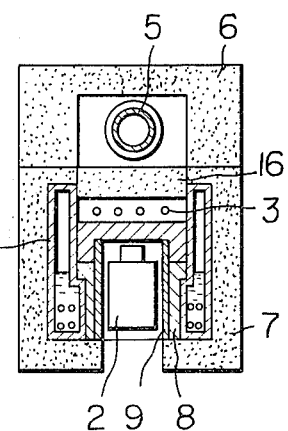
Figure 8:
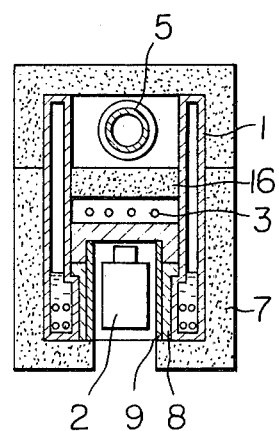
Figure 9:
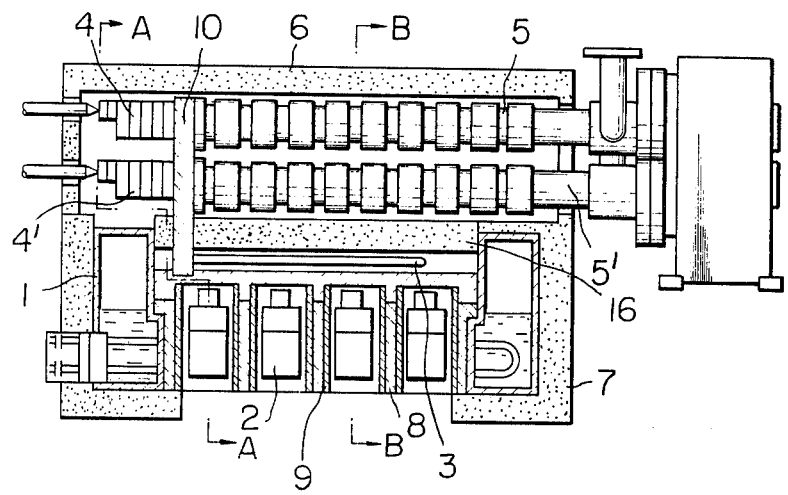
Figure 10:
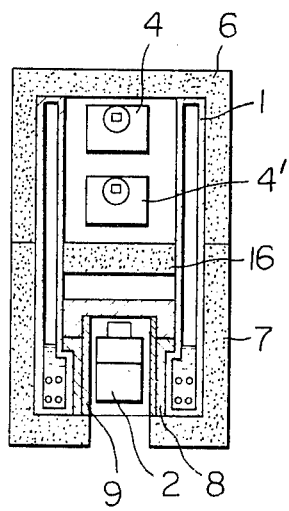
Figure 11:
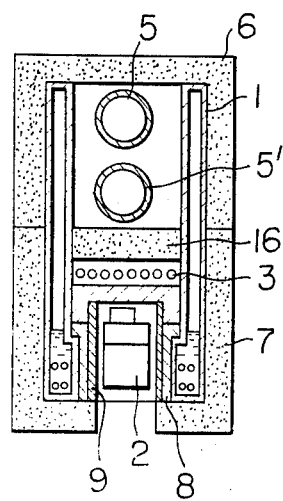
Figure 12:
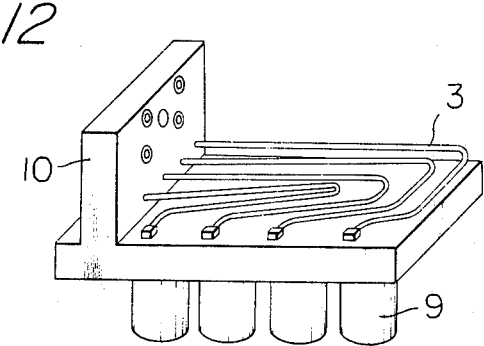
Figure 13:
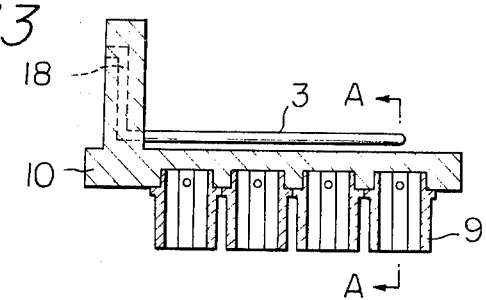
Figure 14:
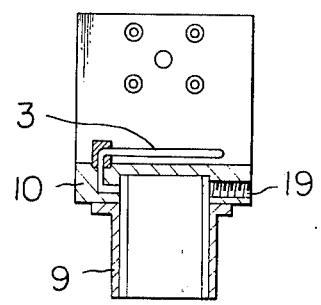

For a detailed description of the invention reference is made to the accompanying drawings, in which:

FIG. 1 shows, in longitudinal section, one embodiment of the spinning apparatus of the invention, FIG. 2 is a section along the line A—A in FIG. 1, FIG. 3 is a section along the line B—B in FIG. 1, FIG. 4 shows disassembled members of the spinning apparatus shown in FIG. 1, FIG. 5 is, in longitudinal section, another embodiment of the spinning apparatus of the invention, FIG. 6 is a section along the line A—A in FIG. 5, FIG. 7 is a section along the line B—B in FIG. 5, FIG. 8 is a similar section of a modified embodiment of the spinning apparatus shown in FIG. 5, FIG. 9 is, in longitudinal section, still another embodiment of the spinning apparatus of the invention, FIG. 10 is a section along the line A—A in FIG. 9, FIG. 11 is a section along the line B—B in FIG. 9, FIG. 12 is a perspective view of an integrated structure of a block and conduits, FIG. 13 is a longitudinal section of the structure shown in FIG. 12, and FIG. 14 is an enlarged section along the line A—A in FIG. 13.

Referring to FIGS. 1, 2 and 3, a plurality of spinning packs 2 are positioned in a line inside a heating frame 1. A metering pump 4 is positioned adjacent to a screw-type extruder 5 in a manner such that the metering pump 4 and the axis of the extruder 5 forms a substantially horizontal line parallel to the line of the spinning packs 2. The metering pump 4 and the substantial part of the barrel and screw of the extruder 5 are located in the upper part of the heating frame 1. A plurality of conduits 3 for permitting the molten polymer passage therethrough, the number of which is equal to or more than the number of the spinning packs 2, are provided for the connection of the metering pump 4 with the spinning packs 2. The conduits 3 extend on a substantially horizontal plane mediating between the extruder 5 and the line of the packs 2 and are located inside the heating frame 1.

The metering pump 4 may be either of a so-called multi-stream type which has a plurality of outlets, the number being equal to or more than the number of the spinning packs 2, and a capacity of metering the total amount of molten polymer, or of a type which is composed of a plurality of metering pump units.

A molten polymer extruded from the extruder 5 is forced to the metering pump 4 where the polymer is metered and divided into streams, the number being equal to the number of the spinning packs 2. Each stream of molten polymer flows through the respective conduit 3 to the respective spinning pack 2 where the molten polymer is filtered and extruded through orifices to the atmosphere to be formed into filaments.

The heating frame 1 may be of a hollow structure as shown in FIGS. 1, 2 and 3, in which a heat transfer medium 12 is charged. The heat transfer medium may be either of the type which functions in the form of liquid such as so-called oils or of the type which functions in the form of vapor such as Dowtherm A (trade name). Alternatively, the heating frame 1 may be of a solid structure made of a metal, having an electric heating wire embedded therein.

The substantial part of the barrel of the extruder 5, the metering pump 4, the conduits 3 and the spinning packs 2 are located inside the heating frame 1, and therefore, all these members are heated from the both sides and the metering pump 4 is heated further from the lower side. The heating frame 1 is encased in a casing of a thermal insulation material, which consists of an upper casing 6 and a lower casing 7.

The extruder 5 is joined, at the extruding end thereof, to the vertically extending portion of a block 10 having the passages 3 for the molten polyer, bored therein. The metering pump 4 is joined interposing an intermediate plate 11 to the vertically extending portion of the block 10. The join of the metering pump 4 and the extruder 5 is made by tightening tap bolts. The metering pump 4 and the extruder 5 are detachable from the block 10 by loosening the tap bolts. The spinning packs 2 are pressed against the block 10 by tightening tap bolts, in a manner such that the polymer inlet of each spinning pack 2 is brought in line with the outlet end of each conduit 3.

Referring to FIG. 4, the spinning apparatus of the invention is capable of being disassembled. The heating frame 1 is inserted into the casing 7. An equalizer 8 made of a metal such as aluminum is inserted into the heating frame 1. Pack housings 9 detachably joined to the block 10 are inserted into the holes bored in the equalizer 8. Reference numerals 13 and 14 are perforations, through which tap bolts are forced into pitholes 15 of the block 10 when the spinning apparatus is assembled. Since the extruder 5, the metering pump 4 and the spinning pack housings 9 are detachably joined to the block 10, these members are capable of being easily removed from the heating frame 1. This is convenient for cleaning and repairing the members.

Referring to FIGS. 5, 6 and 7 which show another embodiment of the spinning apparatus of the invention, conduits 3 for permitting the molten polymer passage therethrough from the metering pump 4 to the spinning packs 2 are formed by pipes extending on a substantially horizontal plane, which are integrally fitted with a block 10. The conduits 3 are located between an intermediate plate 16 of a thermal insulation material and the horizontally extending portion of the block 10. In this embodiment, the screw-type extruder 5 is provided with a heating means such as a band heater 17; and, as seen in FIG. 7, the side wall portions of the heating frame 1 do not reach the level of the extruder 5. And, the intermediate thermal insulation plate 16 is placed between the extruder 5 and the conduits 3. This heating system is effective for maintaining the extruder 5 at a temperature different from those of the conduits 3, the metering pump 4 and the spinning packs 2.

If desired, the extruder 5 may be heated by a heating means such as the band heater 17 and the heating frame 1 as shown in a modification in FIG. 8. This heating system is effective in the case where it is difficult to maintain the extruder 5 at the desired temperature when heated by either the band heater or the heating frame.

An integral structure composed of the block 10 and the conduits 3, as set forth hereinbefore in reference to FIGS. 5, 6 and 7, is more clearly illustrated in FIGS. 12, 13 and 14. Passages 18 for permitting the molten polymer to pass therethrough are bored in the vertically extending portion of the block 10. Each passage 18 is brought in line with the respective conduit 3. Spinning pack housings 9 are joined onto the lower surface of the block 10 by means of bolts (not shown). Spinning packs (not shown) are inserted into the pack housings 9, and jointed with the block 10 by tightening tap bolts (not shown) forced into perforations 19.

Referring to FIGS. 9, 10 and 11, two screw-type extruders 5 and 5' and two metering pumps 4 and 4' are placed inside the heating frame 1. The two extruders are horizontally arranged in parallel with each other in a manner such that the axes of the extruders are on a substantially vertical plane. Two different polymers are melted in respective extruders and fed to respective metering pumps where each molten polymer is metered and divided into a plurality of streams, the number of which is equal to or more than the number of the spinning packs 2. Two streams of different molten polymers flow into each spinning pack 2 and are extruded as, for example, composite filaments.

Instead of the above-mentioned arrangement of extruders shown in FIGS. 9, 10 and 11, extruders may be arranged in a manner such that the axes of the extruders are on a substantially horizontal plane (not shown).

While some preferred embodiments of the invention have been illustrated it is to be understood that changes and variations may be made without departing from the spirit and scope of the invention.

For example, while the above-illustrated spinning apparatuses are provided with four spinning packs, each being of a cylindrical shape and having a circular spinnerette plate, both the number and the shape, of the spinning pack may be varied. Instead of the cylindrical shape, spinning packs each having a rectangular parallel piped shape may be employed. In this embodiment, the spinning packs may be provided with square spinneret plates or one rectangular spinneret plate.

It is also possible to place two or more sets of extruder(s), metering pump(s), conduit(s) and spinning pack(s) inside one heating frame of a large size.

Advantages of the spinning apparatus of the invention are summarized as follows.

1. At least one extruder, at least one metering pump, at least one conduit and at least one spinning pack can be positioned in a limited space. Therefore, the apparatus is compact. When a plurality of the apparatuses are closely arranged in parallel with each other, increased spinning capacity is obtainable within a relatively narrow space.

2. At least one metering pump, at least one conduit and at least one spinning pack are positioned inside a heating frame, and heated by thermal conduction, convection and radiation from the heating frame. Therefore, the apparatus is economical in heat consumption and the operation cost is reduced. When the barrel portion of the extruder is placed together with the above members inside the heating frame, the apparatus is more advantageous.

3. All members of the spinning apparatus, particularly those which are in contact with the molten polymer, are capable of being readily removed from the heating frame. Therefore, the cleaning, repair and exchange of these members can be easily made either in situ or at any other places. Assembly of the apparatus is also easy.

We claim:

1. An apparatus for melt spinning a fiber-forming synthetic polymer comprising at least one screw-type extruder for melting and extruding the synthetic polymer, at least one metering pump for metering the synthetic polymer, a plurality of spinning packs arranged in a horizontal line parallel to the axis of the extruder and directly beneath the extruder and a plurality of conducts for permitting the molten polymer to pass therethrough from the metering pump to each spinning pack, characterized in that the metering pump, the spinning packs and the conduits are positioned inside a heating frame provided with a heating means; said heating frame being encased, together with the portion of the extruder to be heated, in a casing of a thermal insulation material; and the conduits extend on a substantially horizontal plane located above the spinning packs and beneath the extruder; and the extruder and the metering pump form a substantially horizontal line.

2. An apparatus according to claim 1 wherein said portion of the extruder to be heated is positioned inside said heating frame.

3. An apparatus according to claim 1 wherein said conduits are integrated with a block having a vertically extending portion and a horizontally extending portion.

4. An apparatus according to claim 3 wherein the extruder is detachably joined to one side of the vertically extending portion of said block and the metering pump is detachably joined to the other side thereof, and the spinning packs are detachably joined to the lower side of the horizontally extending portion of said block.

5. An apparatus according to claim 3 wherein said block is detachably joined with the extruder, the metering pump and the spinning packs and supported by the heating frame in a manner such that said block is capable of being removed from the heating frame.

6. An apparatus according to claim 6 wherein at least one conduit is provided for each of said spinning packs.

7. An apparatus according to claim 1 wherein the extruder is provided with at least one barrel heater at the portion of the extruder to be heated.

8. An apparatus according to claim 1 wherein an intermediate plate of a thermal insulation material is placed between the extruder and the conduits.

9. An apparatus according to claim 1 wherein said spinning pack is of a rectangular parallelepiped shape and arranged in a manner such that the horizontal, longitudinal direction of the spinning packs are parallel to the axis of the extruder.

10. An apparatus according to claim 1 wherein said at least one extruder is at least two extruders substantially horizontally arranged in parallel relationship to each other.

11. An apparatus according to claim 10 wherein the axes of the extruders form a substantially vertical plane.

* * * * *